United States Patent [19]

Heckmann

[11] Patent Number: 5,725,669
[45] Date of Patent: Mar. 10, 1998

[54] CAR BODY SURFACE TREATMENT DEVICE

[75] Inventor: Nobert Heckmann, Morschen Konnefeld, Germany

[73] Assignee: ABB Fläkt AB, Stockholm, Sweden

[21] Appl. No.: 722,121

[22] PCT Filed: Mar. 24, 1995

[86] PCT No.: PCT/EP95/01125

§ 371 Date: Dec. 12, 1996

§ 102(e) Date: Dec. 12, 1996

[87] PCT Pub. No.: WO95/26311

PCT Pub. Date: Oct. 5, 1995

[30] Foreign Application Priority Data

Mar. 25, 1994 [DE] Germany ............... 44 10 477.4

[51] Int. Cl.⁶ ........................................ B05C 3/02
[52] U.S. Cl. ............ 118/423; 118/409; 118/426; 118/428; 118/500; 198/403
[58] Field of Search ................. 118/409, 423, 118/426, 428, 500, 501; 198/403, 404

[56] References Cited

U.S. PATENT DOCUMENTS 2,598,163  5/1952  Halls.

FOREIGN PATENT DOCUMENTS 4304145  4/1994  Germany.
1434348  5/1976  United Kingdom.
2229381  9/1990  United Kingdom.

OTHER PUBLICATIONS

Patent Abstracts of Japan vol. 9, No. 278 (C–312), Nov. 6, 1985 & JP, 60 125 275, Jul. 4, 1985.

*Primary Examiner*—Donald E. Czaja
*Assistant Examiner*—Michael P. Colaianni
*Attorney, Agent, or Firm*—Dilworth & Barrese

[57]   ABSTRACT

In a simple car body surface treatment device, the car body (16) is brought into and taken out of the treatment bath (1) exclusively by rotation of a revolving device (2). The car body (16) arranged on a loading carriage (11) is detachably connected to the revolving device (2). In addition, conveyors (12, 13, 17, 18) are provided for carrying the loading carriage (11) on to or away from the revolving device (2). The device is characterized by the conveyors (12, 13, 17, 18) being located outside of the treatment bath (1). The conveyors (17, 18) located in the area of rotation of the revolving device (2) may be moved out of and into this area.

17 Claims, 3 Drawing Sheets

CAR BODY SURFACE TREATMENT DEVICE

BACKGROUND OF THE INVENTION

The invention relates to a surface treatment device for one or more car bodies, having a rotating device, to which at least one car body mounted on a loading carriage is detachably connectable and which dips the car body into a treatment bath by rotation and in turn takes it out of said bath by a rotation, as well as having conveyors for carrying the loading carriage on to or away from said rotating device.

A device for the surface treatment of car bodies, which are dipped by rotation into a treatment bath and are taken out of same by counter-rotation, is known from GB 2 229 381. In this known device, a car body is securely connected to a loading pallet. This unit composed of a loading pallet and car body mounted thereon is fitted on to a roller carriage. This roller carriage is equipped with non-driven rollers which enable a displacement to the side of the car body's longitudinal axis. By means of such a non-driven roller carriage, the loading pallet is conveyed from the treatment bath to other processing stations.

The entire composite structure, consisting of the car body, loading pallet and roller carriage, is pushed on to a mount which is attached above each treatment bath. This mount has a rotation axis perpendicular to the car body's longitudinal axis or parallel to the direction of conveyance. By rotation around the rotation axis through 180°, the entire composite structure of car body, loading pallet and roller carriage can now be dipped into the treatment bath. During the immersion operation, his mount and the unit of car body, loading pallet and roller carriage are connected together by means of locking pins.

A conveyor belt extending across several treatment stations and their treatment tanks is used to transport the car bodies or roller carriages. These treatment stations are laterally adjacent. The conveyor belt transports the roller carriages, on which a loading pallet with its car body is respectively fitted, from treatment tank to treatment tank. Vertically positioned pallet pieces, which make contact with the roller carriage, are fitted on the conveyor belt for this purpose.

This type of device for the introduction of a car body enjoys the advantage that a simple mechanism is used to minimize the extent to which the treatment fluid in the treatment bath is spilled, in that the car body is rotated into the treatment bath via the front or the rear side. During the rotation process, the quantity of air entrapped within the car body is continuously able to escape from the car body's windows.

This device's structure is relatively complex and only suitable for small-scale systems. When a car body is immersed, the next body must wait until the first body's process time has elapsed. This process time amounts to as much as three minutes in the case of individual process stages and is even longer in the case of cathodic dip painting.

DE 43 04 145 C1 describes a device of the named class in which a car body is also dipped into a treatment bath by means of rotation. In the case of the immersed car body, it is also possible for another car body to be fitted on to this rotating device and to be detachably connected or for it to be able to pass over the rotating device.

In the known device, a loading carriage is used to receive and fix the car body. The loading carriage and car body are pushed on to the rotating device by means of one or more driven rollers and are detachably connected thereto by means of fixing devices. The rotating device is attached above the treatment bath and comprises a rotation axis transverse to the direction of conveyance of the car bodies. The car body is now introduced by rotating the rotating device in such a manner that the car body is dipped via its front or rear side into the treatment bath. One or more of the rollers on the upper and lower sides of the rotating device are respectively driven so that the loading carriages and car bodies can be passed along.

This design suffers from the disadvantage that the rotating device comprises a plurality of mechanically mobile parts (guidance rollers and rollers for moving the loading carriage) which accumulate a significant amount of dirt as a result of the painting process and which contaminate the paint bath with dried paint residue. Because the rollers are repeatedly dipped in the treatment bath, their functioning cannot be ensured even after a short period of time.

SUMMARY OF THE INVENTION

The technical problem upon which the invention is based is to provide a car body surface treatment device in which accumulation of dirt on the mechanically mobile parts is largely avoided when the car bodies are introduced by rotation.

This technical problem is solved in a device according to the class in that the conveyers are located outside the treatment bath and the conveyers located within the rotating device's area of rotation can be moved out of and into this area.

The invention is based on the idea of arranging the conveyers used for introducing and removing the loading carriages with the car bodies secured thereto, as well as the drive and guidance rollers, conveyer belts etc. in such a manner that they themselves do not dip into the treatment tank during car body treatment, i.e. they are secured separately from the loading carriage and rotating device. As a result, substantial dirt accumulation and any malfunctions affecting the drive and guidance rollers as well as any necessary conveyer belts can be largely prevented. As a result of the mobile design of the conveyers, which are located in the area of rotation of the rotating device with the car body fitted thereon, these parts can also be guided out of, and if necessary back into, the area of rotation. A rotary movement of the rotational device can therefore take place in an unlimited manner in its angle of rotation. The retractable and protractable conveyors also make it possible to pivot the car body fitted on the rotational device in its immersed state, thereby allowing the entrappad air bubbles to escape more effectively, which leads to a higher-quality coating result.

By guiding the movable conveyors out of the rotating device's area of rotation during the rotational raising movement, an accumulation of dirt on the transport or conveying means caused by paint flowing down the car body is minimized and hence the risk of dirt accumulating inside the treatment bath due to residual paint dried on the conveyors is reduced.

The design input is likewise substantially simplified when designing the rotating device, resulting in lower production costs and making it less expensive to control and maintain the system.

In particular, the simple structure of the device according to the invention makes it possible to increase the cycle rate at which the car bodies are introduced into the treatment bath by the fact that it is already possible to start conveying another car body over the treatment bath even though the preceding car body has not yet been completely immersed, thereby increasing the capacity of the entire system (several baths connected in series). All in all, the immersion process is improved by these measures in terms of achievable coating quality and economy.

The conveyors advantageously comprise guidance and driven drive rollers in order to carry the loading carriage and the car body mounted thereon on to or away from the rotating device. As a result of this simple structure, a loading carriage is guided between a number of facing rollers, whereby one or more of these rollers are driven, causing the loading carriage to be moved by transfer of friction. This also makes it possible for a loading carriage to be passed on from one treatment station to the next in a simple manner.

Since the conveyors located within the rotating device's area of rotation can be guided out of or into the area of rotation as required, it is possible to pivot an immersed car body in an unlimited way. As already mentioned, residual paint and dye, which contaminate the bath, are also largely avoided in that the conveyors can be moved away from the dripping area when the car body which has already been treated is raised.

A very simple and inexpensive design solution for guiding the conveyor in and out is to attach this conveyor to a sliding means, such as a hydraulic ram, electrical drive or chain drive, in a slidable manner across the treatment bath on facing sides, allowing the loading carriage to be guided or passed on with its edge regions on the guidance and drive rollers. It is just as suitable to rotate the conveyors away, in which case hydraulic, pneumatic or electrical drives are possible.

In order that the rotating device and the loading carriage detachably connected thereon can be easily rotated, it is particularly advantageous for the conveyors' individual guidance and drive rollers to be each fitted with a raised edge at least on one roller side, causing the loading carriages to be guided and driven, though the loading carriage guided thereon is still able to "rotate away in an upwards direction" without hindrance.

So that the air bubbles entrapped within the immersed car body can completely escape at the car body's rear or front side, it is particularly advantageous for the bodies to be immersible into the treatment bath by rotation through up to 210°, with the conveyors located in the area of rotation being retractable or protractable, if necessary.

If for example, the configuration of the individual treatment baths makes it desirable to dip the car bodies into the treatment bath or to guide them out of it by rotation through 360°, it is particularly advantageous to arrange in a movable manner all those conveyors located within the area of rotation.

In the device according to the invention, it is advantageously possible for the car bodies, in their immersed state, to be able to be rotated through up to 30° in both directions of rotation so as to enable the entrapped air bubbles to escape more effectively.

The conveyors with their guidance and drive rollers are advantageously movably arranged outside the rotating device so that during the immersion operation, they can be guided into a position which enables one or more successive car bodies to pass over the tank or treatment bath, making it possible to increase further the cycle rate at which the car bodies are to be treated, with the treatment baths arranged in succession.

If the rotating device is fitted with fixing and locking means for detachably securing a loading carriage not only on the upper side but also on the lower side, it is possible, when a car body is immersed, to fit another car body on the same rotating device by means of the conveyors attached to the edge of the treatment bath. Only those conveyors attached above the treatment bath are advantageously required in the rotating device according to the invention in order to treat the surface of several car bodies simultaneously, rather than treating the surface on the upper and lower sides respectively, as is the case with the known devices.

The necessary combination of spraying and dipping processes is made possible by the device according to the invention in which the known loading carriage technique is used; this applies both to the pretreatment of the car bodies and to the dip-painting thereof.

To portray and explain the invention more effectively, an exemplary embodiment will be described and explained in further detail with reference to the enclosed drawings as follows.

DESCRIPTION OF THE PREFERRED EMBODIMENTS

Figure 1:
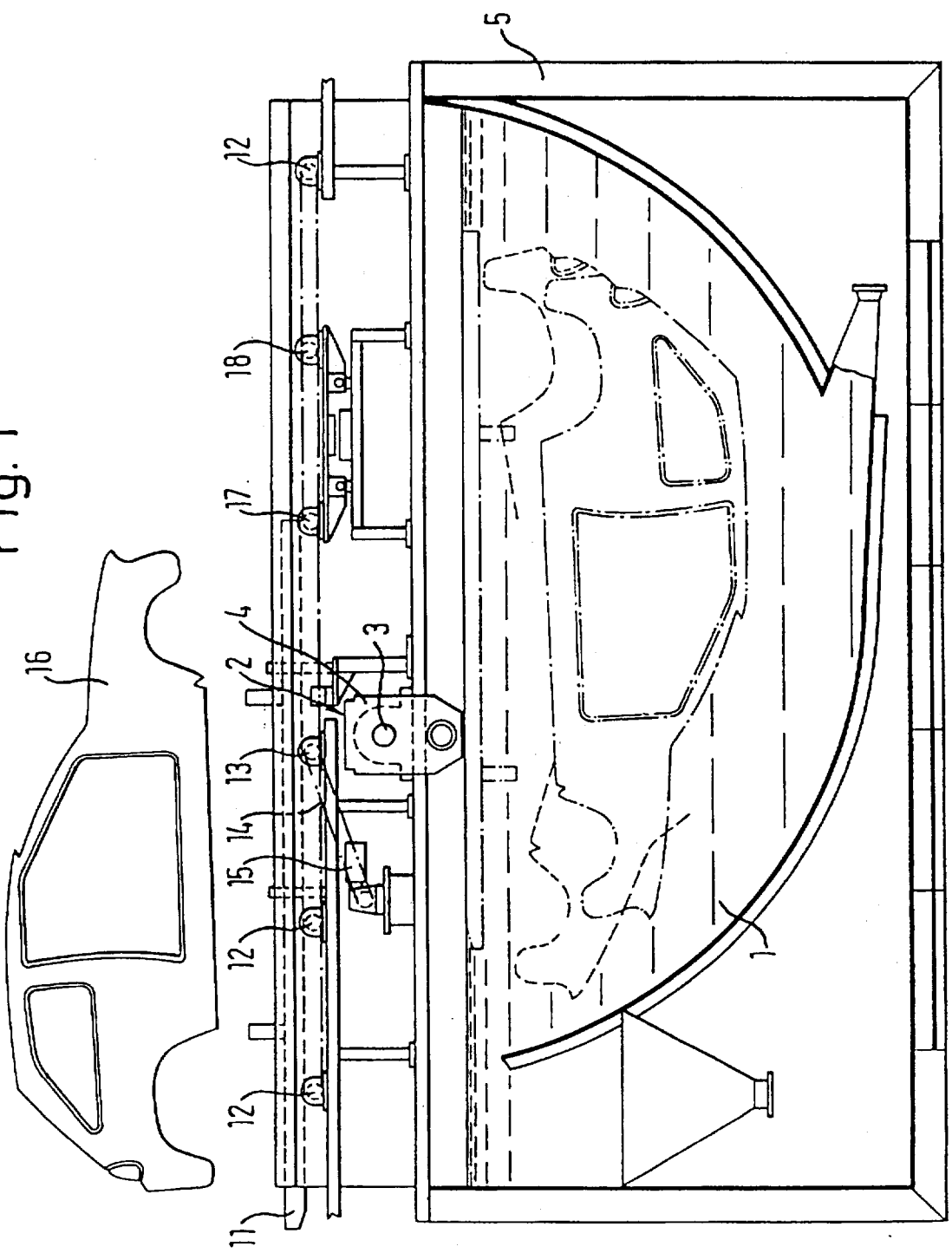
FIG. 1 shows a schematic longitudinal section of a treatment tank with a car body surface treatment device according to the invention, having a rotating device.

As shown in FIG. 1, in the device according to the invention, a rotating device 2 is attached above a treatment tank for treatment bath 1. Rotating device 2 is supported at the left and right of the ends of a rotation axis 3 by bearing brackets 4 on a container wall 5. Conveyors, which are formed as guidance rollers 12, drive rollers 13 and slidable guidance and drive rollers 17 and 18, are located above treatment tank 1. Drive rollers 13 are driven by an electric motor 15 by means of a conveyor belt 14. In the state shown in FIG. 1, a loading carriage 11 with a car body 16 secured thereon is carried on to rotating device 2 by means of non-driven guidance rollers 12 and driven drive rollers 13. Other guidance rollers 12 at the side above treatment bath 1 and slidable guidance and drive rollers 17, 18 are attached in the direction of conveyance ahead of car body 16 and loading carriage 11.

Figure 2:
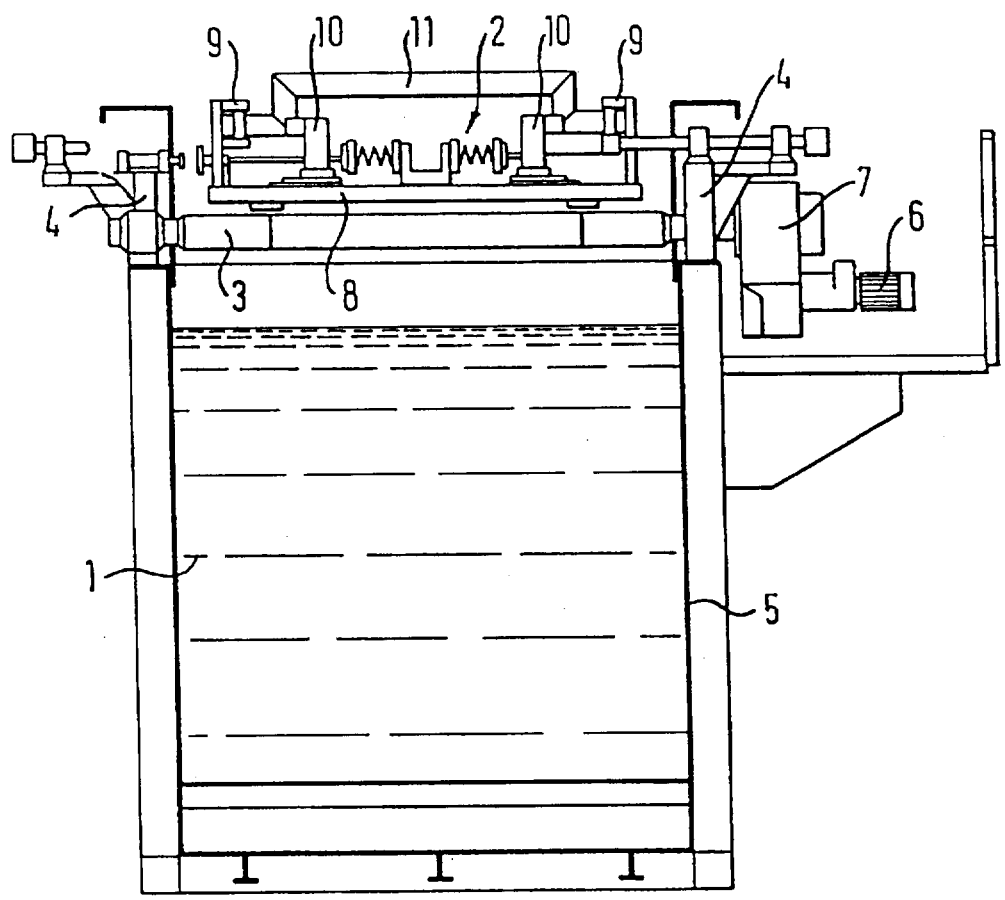
FIG. 2 shows a schematic cross section of the device according to the invention as shown in FIG. 1.

As schematically shown in FIG. 2, rotating device 2 is fitted with a frame 8, fixing devices 9 attached thereon and locking devices 10. Bearing brackets 4, with which the ends of rotation axis 3 engage, also render apparent the way in which rotating device 2 is supported. Rotation axis 3—as already mentioned—is driven via a gear 7 by a drive 6.

Loading carriage 11, shown here without car body 16, engages with fork-shaped fixing device 9 by means of its longitudinal members and is guided as a result. Fixing devices 9 are used for laterally guiding loading carriages 11 while they are being carried on to rotating device 2. Locking devices 10 comprise a slidable pin which respectively engages with a recess provided for this purpose at the side within loading carriage 11. Locking device 10 may, however, also be fork-shaped in design, allowing the fork to engage with a corresponding recess when loading carriage 11 is interlocked.

Figure 3:
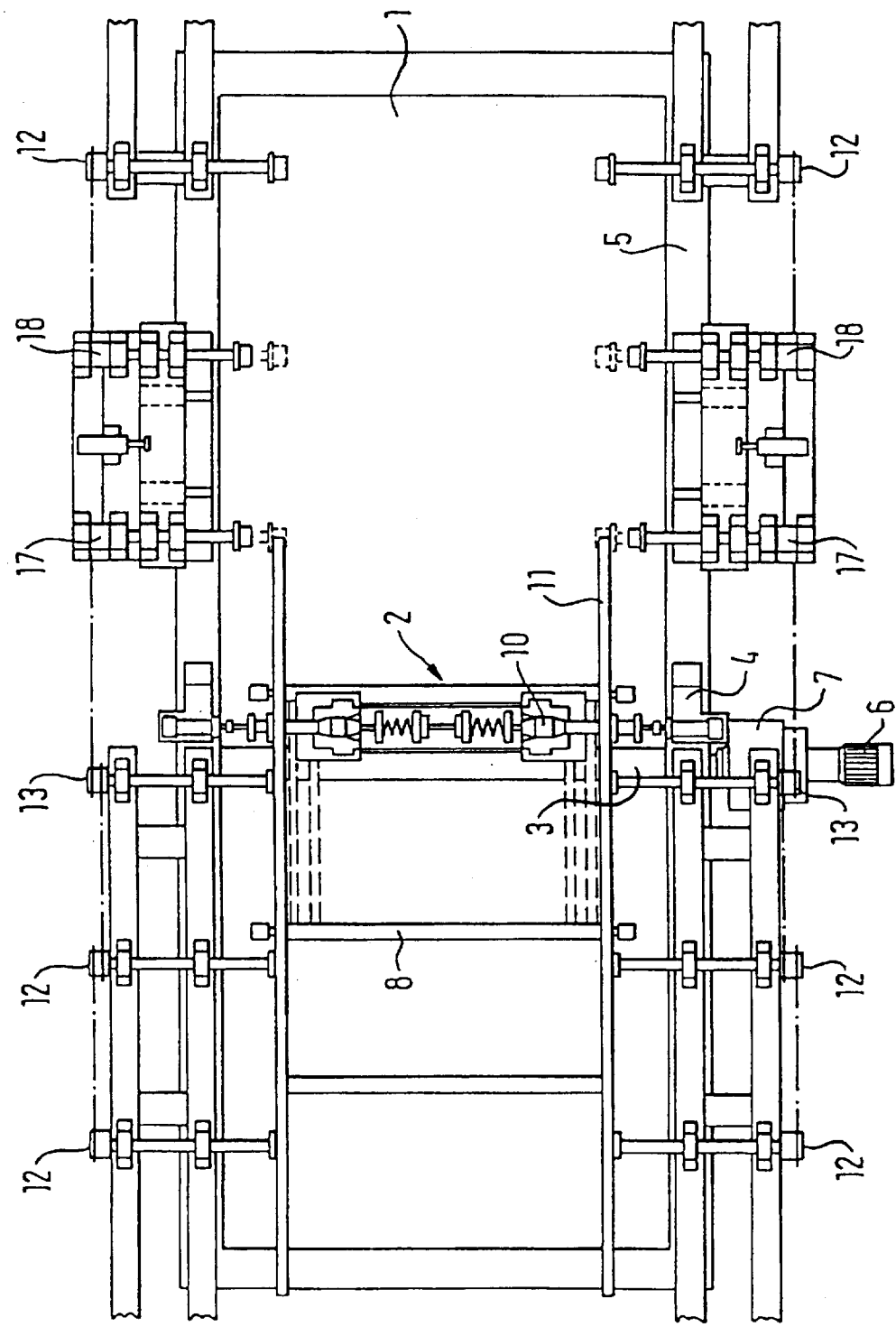
FIG. 3 shows a horizontal projection of the device according to the invention, with a rotating device and conveyors which can to an extent be positioned; the car body is not depicted in this top view.

In the horizontal projection represented in FIG. 3, the regular distribution of guidance rollers 12 and drive rollers 13 as well as of slidable guidance rollers and drive rollers 17 and 18 becomes particularly clear. The distances of these rollers 12, 13, 17 and 18 are obtained by the schematically shown length of loading carriage 11, causing this carriage to be driven and guided at all times during transportation. In this exemplary embodiment, only guidance and drive rollers 17 and 18, which are located ahead of non-immersed rotating device 2 and within its area of rotation, i.e. around rotation axis 3, are designed to be slidable. It is, however, conceivable for rear rollers 12 and 13 to be slidably designed as well if rotating device 2 is rotated through 360°.

The operational mode of this embodiment of the device according to the invention will now be explained.

Before the surface treatment or the treatment of car bodies commences as a composite structure of several treatment stations, car body 16 is securely connected to a loading carriage 11. Loading carriage 11 is transported on to rotating device 12 via guidance rollers 12 and by means of drive rollers 13. The loading pallet of loading carriage 11 is guided by the side guides of fixing device 9, which are attached to frame 8 of rotating device 2.

If loading carriage 11 is correctly positioned on rotating device 2, geared motor 15 of drive rollers 13 is brought to a halt and the loading carriage is securely connected to rotating device 2 by locking devices 10. This takes place by squeezing locking devices 10 or by fastening them with pins; these locking devices engage inside loading carriage 11.

Movable guidance rollers 17 and movable drive rollers 18 above the forward area of treatment tank 1 are then guided out of the area of rotation of rotating device 2, i.e. slid outwards by hydraulic rams in order to make it possible for rotating device 2 to rotate car body 16 subsequently by up to 180° or more. During the rotating operation, rotating device 2 with loading carriage 11 and car body 6 secured thereon dips into treatment bath 1. On completion of the rotation operation, car body 16 is now completely immersed within treatment bath 1. The rotation has caused the previous upper and lower sides of rotating device 2 to be changed around.

If the intention is to dip car body 16 into treatment bath 1 in the reverse direction of rotation, movable conveyors 17 and 18 are located above the rear area of tank 1.

If a rotation through more than 180° is desired, movable guidance and drive rollers 17 and 18 both above the front and rear areas of treatment tank 1 can, depending on the required angle of rotation, be designed in such a manner that they can be guided out of and into the area of rotation. As a result, the entire area above treatment tank 1 is left clear for a rotary movement in any direction and any angle of rotation.

As soon as the immersion operation or the rotary movement allows a position in which guidance rollers 17 and drive rollers 18, which can be guided out of and into the area of rotation, no longer impede the rotary movement, these rollers 17 and 18 are correspondingly guided back into their initial position. It is now possible for a subsequent car body 16 on a loading carriage 11 to pass over treatment tank 1.

If a pivoting of car body 16 in its immersed state is desired, guidance rollers 17 and drive rollers 18, which can be guided out of and into the area of rotation, can be guided into and out of the area of rotation in order to enable car body 16 to pivot in both directions of rotation.

In a further exemplary embodiment not shown here, not only the upper but also the lower side of the rotating device is provided with a fixing device 9 and a locking device 10. When car body 16 is immersed, it is then possible to fix a further loading carriage 11 on what is now the upper side. By rotation through another 180° or by rotating back through 180°, the new mounted car body is dipped into treatment bath 1 and at the same time, the treated car body is guided out of this bath.

I claim:

1. A device for the surface treatment of one or more car bodies (16), comprising
   a rotating device (2) to which at least one car body (16) mounted on a loading carriage (11) is detachably connectable and which dips said car body (16) into a treatment bath (1) by rotation and in turn guides said body out of said bath by rotation,
   conveyor means (12, 13, 17, 18) for carrying said loading carriage (11) on to or away from said rotating device (2),
   said conveyor means (12, 13, 17, 18) are attached outside said treatment bath (1), and
   said conveyor means (17, 18) located within the area of rotation of said rotating device (2) can be moved out of or into said area of rotation.

2. A device according to claim 1, wherein said conveyor means comprise guidance rollers (12) and drive rollers (13).

3. A device according to claim 1, wherein said conveyor means (17, 18), which can be guided into or out of said area of rotation are slidable by a positioning means.

4. A device according to claim 1, wherein said conveyor means (12, 13, 17, 18) comprise rollers which have a raised edge at least on one roller side, so that said loading carriages (11) can be guided and driven.

5. A device according to claim 1, wherein said car body (16) is immersible into said treatment bath (1) by rotation through more than 210° and can in turn be guided out of said bath by a rotation.

6. A device according to claim 1, wherein said car body (16) is immersible into and can be guided out of said treatment bath (1) by rotation through 360°.

7. A device according to claim 1, wherein in its immersed state, said car body (16) is rotatable in both directions through up to 30° in order to enable entrapped air bubbles to escape.

8. A device according to claim 1, wherein said conveyor means required for carrying said car bodies (16) and designed in the form of guidance rollers (17) and drive rollers (18) are movably arranged outside said rotating device (2) such that during the immersion operation, they can be guided into a position which enables one or more successive car bodies (16) to pass over said bath (1).

9. A device according to claim 2, wherein said conveyor means (17, 18), which can be guided into or out of said area of rotation are slidable by a positioning means.

10. A device according to claim 2, wherein said conveyor means (12, 13, 17, 18) comprise rollers which have a raised edge at least on one roller side, so that said loading carriages (11) can be guided and driven.

11. A device according to claim 3, wherein said conveyor means (12, 13, 17, 18) comprise rollers which have a raised edge at least on one roller side, so that said loading carriages (11) can be guided and driven.

12. A device according to claim 2, wherein said conveyor means required for carrying said car bodies (16) and designed in the form of guidance rollers (17) and drive rollers (18) are movably arranged outside said rotating device (2) such that during the immersion operation, they can be guided into a position which enables one or more successive car bodies (16) to pass over said bath (1).

13. A device according to claim 3, wherein said conveyor means required for carrying said car bodies (16) and designed in the form of guidance rollers (17) and drive rollers (18) are movably arranged outside said rotating device (2) such that during the immersion operation, they can be guided into a position which enables one or more successive car bodies (16) to pass over said bath (1).

14. A device according to claim 4, wherein said conveyor means required for carrying said car bodies (16) and designed in the form of guidance rollers (17) and drive rollers (18) are movably arranged outside said rotating device (2) such that during the immersion operation, they can be guided into a position which enables one or more successive car bodies (16) to pass over said bath (1).

15. A device according to claim 5, wherein said conveyor means required for carrying said car bodies (16) and designed in the form of guidance rollers (17) and drive rollers (18) are movably arranged outside said rotating device (2) such that during the immersion operation, they can be guided into a position which enables one or more successive car bodies (16) to pass over said bath (1).

16. A device according to claim 3, wherein said positioning means is selected from the group consisting of a hydraulic ram, electrical drive, and chain drive.

17. A device according to claim 9, wherein said positioning means is selected from the group consisting of a hydraulic ram, electrical drive, and chain drive.

* * * * *